Patented Nov. 21, 1939

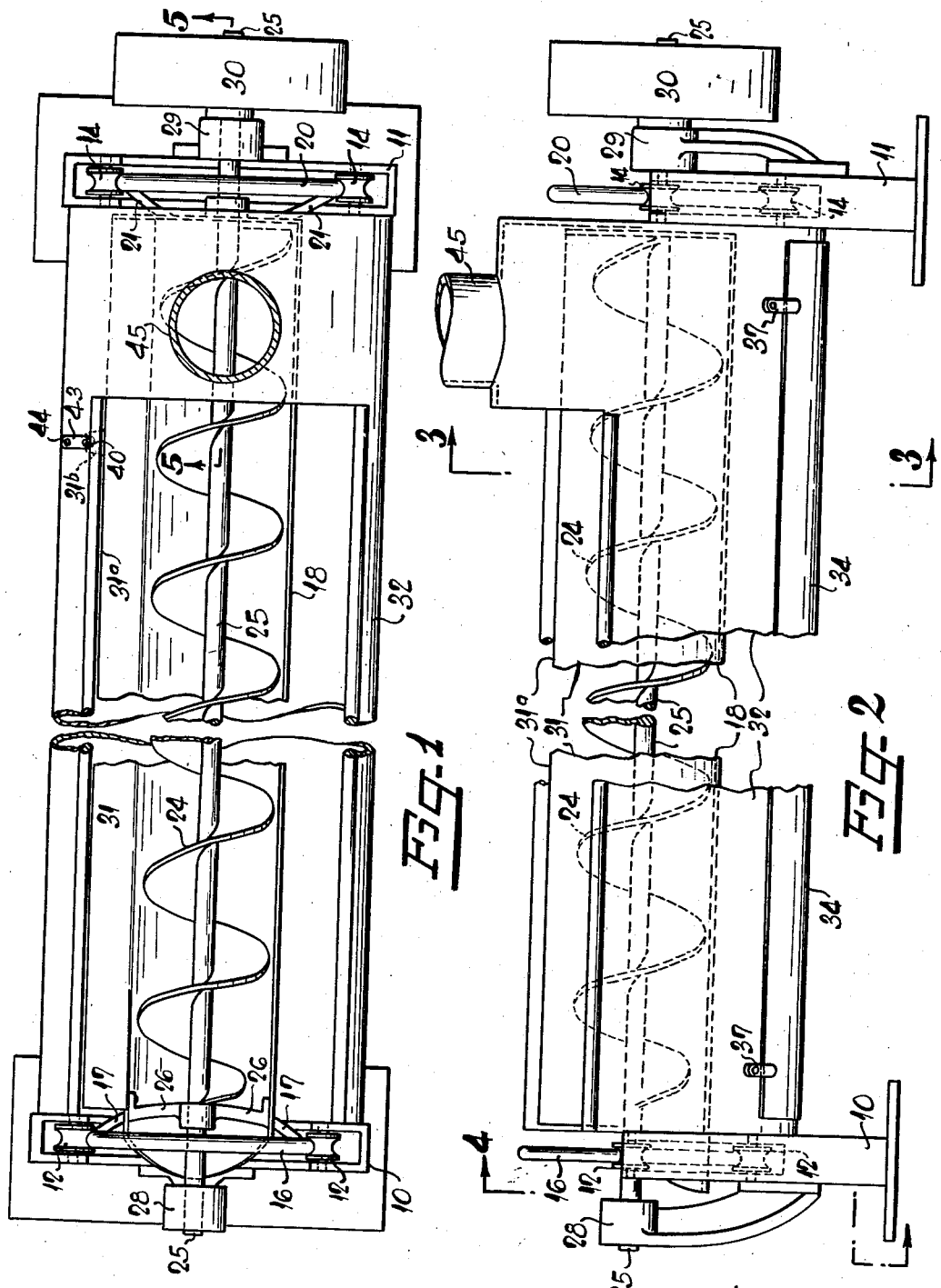

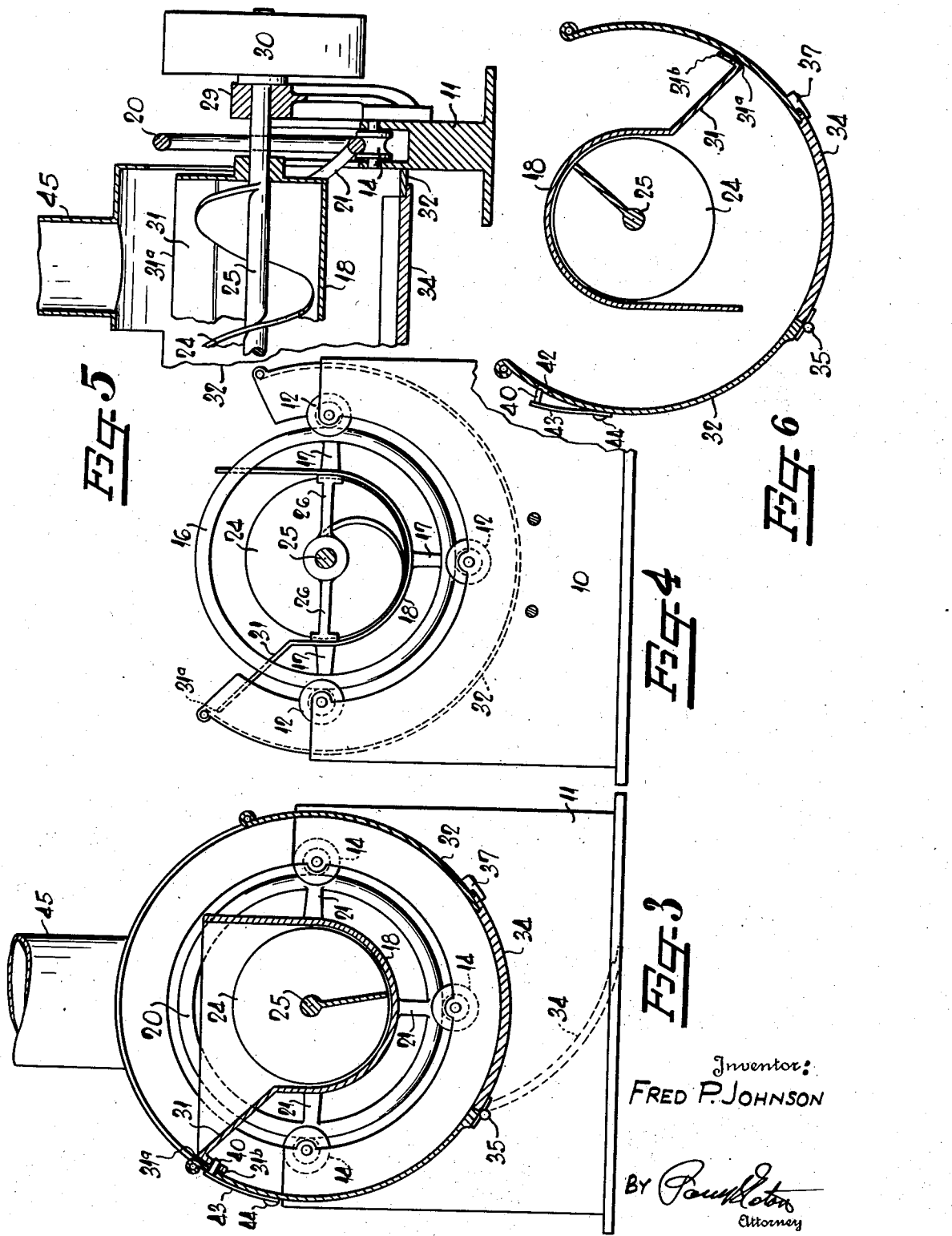

2,180,681

UNITED STATES PATENT OFFICE 2,180,681

CONVEYER

Fred P. Johnson, Raeford, N. C.

Application February 18, 1938, Serial No. 191,282

5 Claims. (Cl. 198—213)

This invention relates to a conveyer and more especially to one having a bottom therein capable of being inverted so as to remove all material therefrom. Very often when cotton is ginned, the farmer desires to have the seed from a particular lot of cotton, as in cases where the seed are to be used for planting purposes. Unless the conveyer is cleaned and all other seeds removed therefrom, the particular seed are not usable for planting purposes, because other inferior seed, or seed of a different variety which would remain in the conveyer, would be mixed with these planting seed.

It is, therefore, an object of this invention to provide in combination with a spiraled conveyer for cotton seed and the like, a rotatable bottom member secured around the conveyer, said bottom having an open side through which the seed will pass when the bottom member is rotated to an inverted position.

It is a further object of this invention to provide a conveyer of the class described comprising a rotatable bottom and a second bottom concentrically mounted around the rotatable bottom with means secured to the said rotatable bottom for scraping the interior of the second bottom to collect the seed back into the rotatable bottom when desired. In other words, the second bottom merely serves as a container for holding the seed which have been removed from the conveyer, and after a select batch of seed have been conveyed through the conveyer, it is desirable to gather these previously removed seeds from the conveyer back into the rotatable bottom so they will be conveyed to the outlet. In order to accomplish this result, it is only necessary to rotate the rotatable bottom a complete revolution around the conveyer to cause the seed to be again gathered into the bottom and around the spiraled conveyer.

Some of the objects of the invention having been stated, other objects will appear as the description proceeds when taken in connection with the accompanying drawings, in which—

Figure 1 is a top plan view of my improved conveyer with the central portion thereof broken away;

Figure 2 is a front elevation of Figure 1, with slightly more of the central portion broken away;

Figure 3 is a transverse vertical sectional view taken along the line 3—3 in Figure 2;

Figure 4 is a vertical sectional view taken along the line 4—4 in Figure 2;

Figure 5 is a vertical sectional view taken along the line 5—5 in Figure 1;

Figure 6 is a cross-sectional view similar to Figure 3 but showing the rotatable bottom in an inverted position.

Referring more specifically to the drawings, the numerals 10 and 11 denote suitable supports or bents for the conveyer which have grooved rollers 12 and 14 mounted in the upper portion thereof, the periphery of each of the rollers being disposed in the arc of a circle, whose center is the same as the longitudinal axis of the conveyer. Resting in the grooved rollers 12 is a circular ring 16 which has spokes 17 therein. These spokes have their other ends attached to the exterior of conveyer bottom or trough 18 and act as a support for this end. Likewise the grooved rollers 14 at the other end, support a circular ring member 20 which has spokes 21 therein and these spokes are secured to the exterior of the other end of this same trough 18 and act as a support.

This trough has an arcuate bottom which snugly fits the periphery of a spiraled conveyer screw 24 on shaft 25. The left-hand end of the trough and the conveyer screw shaft are tied together by means of spokes 26 whose hub is rotatably mounted around the end of the shaft. Likewise the right-hand closed end of the trough is rotatably supported by the conveyer shaft (Figures 1 and 5). The extreme ends of the conveyer screw shaft 25 are rotatably mounted, however, in bearings 28 and 29 which, in turn, are secured to supports 10 and 11, respectively. In order to provide a means for turning this spiraled conveyer a suitable pulley 30 is fixedly secured on the right-hand end of the conveyer shaft and this pulley is driven from any suitable source of power, not shown.

The conveyer bottom 18 has an inclined side 31 integral therewith whose upper edge is adapted to slide in close proximity with the interior of a second bottom 32. The bottom 32 is fixedly secured between the supports 10 and 11 and has a cross-sectional area, circular in form and concentric with the center of spiraled conveyer 25. Also the axis of rotation of the bottom 18 coincides with the longitudinal axis of bottom 32. Therefore, when the bottom 18 is turned about its axis of rotation, the upper edge 31a of the inclined side 31 will follow the interior periphery of the bottom 32. This bottom is used as a storage space for material such as seed that are dumped from bottom 18.

The bottom 32 also has a door 34 which is hinged as at 35. This door may be opened when it is desired to remove the seed from the second bottom 32 instead of again collecting them in trough 18. When the door 34 is in a closed position, it is held in this manner by means of suitable latch buttons 37.

In order to prevent relative rotation between the bottom 18 and the second bottom 32, a suitable pin 40 is adapted to penetrate lug 31b which extends downwardly from the upper edge of inclined side 31. The pin 40 also penetrates a suitable hole 42 in bottom members 32, and this pin is adapted to be fixedly secured on the free end of spring member 43. This spring member 43 is pivotally secured as at 44 to the exterior of bottom member 32. With the pin 40 in the position shown in Figure 3 the bottom 18 is held in an upright position so that the open side will be disposed on top.

When the bottom is latched in this position, the seed are dropped from the ginning machine into the conveyer 18 through inlet pipe 45. As the conveyer 25 is rotated by the pulley 30, the seed will be moved gradually to the left in Figures 1 and 2, from whence they will be expelled from the left-hand open end of this bottom or trough.

Let us suppose that it is desired to remove all seed from the conveyer trough 18 and around the conveyer screw 25, so that any new seed entering the trough will be free from other seed which might be left therein. The pin 40 is removed from the lugs 31b and to the position shown in Figure 6, at which time the bottom 18 is free to be rotated about the conveyer shaft 25. With the pin thus removed, the operator can then take hold of one of the rings or wheels 16 or 20 and rotate the bottom to an inverted position as shown in Figure 6 so that the seed will be allowed to fall from the conveyer as well as from the bottom of member 18 into the storage bottom 32. Then the bottom member 18 is restored to normal position.

If, after the selected seed have been run through the conveyer, it is desired to collect the other seed in the storage bottom 32 back into the bottom 18 so that the conveyer 24 will carry these seed to its destination, it is only necessary to unlock the pin 40 and then rotate the bottom member 18 one complete revolution in a clockwise manner in Figures 3, 4, and 6. When this is done, the upper edge 31a of the bottom member 18 will scrape the interior periphery of the arcuate member 32 and gather the seed from this bottom and place them back around the spiral conveyer 24. By having the bents support the periphery of the tubular member, which member, in turn, supports the conveyer, it is possible to space the supporting bents at any desired interval, without breaking the continuity of the tubular member and without breaking the continuity of the conveyer shaft. Very often, these conveyers are several hundred feet long; therefore, it is necessary to support the conveyer and the tubular member at several intermediate points. By providing this supporting means the tubular member and conveyer shaft can be made continuous throughout the length of the conveyer. The bearings 28 and 29 are used purely as a stabilizing support for the ends of the conveyer shaft when a belt is placed on pulley 30. The bearings are secondary or auxiliary supports to keep the conveyer shaft 25 concentric with the tubular member 18 when the conveyer is in operation, whereas the primary supports for the tubular member 18 and conveyer shaft 25 are members 12, 16, 17, 14, 20, 21 and 26. There is a dual support for the conveyer shaft. Bearings 28 and 29 are placed on end bents. It is obvious that it would be impossible to place them on intermediate bents because it would necessitate cutting the tubular member 18 and the spiral 24.

It is thus seen that I have provided a spiral conveyer having a rotatable bottom portion, said bottom portion having an open side to allow the seed therein to fall from the bottom portion and the conveyer when the same is in an inverted position. I have also provided means for replacing the seed into this bottom portion and around the conveyer when so desired.

In the drawings and specification there has been set forth a preferred embodiment of the invention, and although specific terms are employed they are used in a generic and descriptive sense only, and not for the purposes of limitation, the scope of the invention being set forth in the appended claims.

I claim:

1. In an apparatus for conveying cotton seed and the like, the combination of a rotary conveyer screw, an open sided tubular member concentrically and rotatably mounted about said screw, a stationary tubular member concentrically mounted relative to said first tubular member, and means disposed on the first tubular member, upon the rotation thereof, for engaging the interior surface of the stationary tubular member to gather the material therefrom into the first tubular member.

2. In an apparatus for conveying cotton seed and the like, the combination of a rotary conveyer screw, an open sided tubular member concentrically and rotatably mounted about said screw, a stationary tubular member concentrically mounted relative to said first tubular member, means disposed on the first tubular member, upon the rotation thereof, for engaging the interior surface of the stationary tubular member to gather the material therefrom into the first tubular member, and a latch for securing the first tubular member against rotative movement.

3. In an apparatus for conveying cotton seed and the like, the combination of a spiraled conveyer screw, a tubular member, having an open upper side, encasing said conveyer and being rotatably supported on the conveyer axis, means for rotating said member about said conveyer, a stationary tubular member and an inter-engaging latch disposed between the tubular members for preventing rotation of the first tubular member.

4. In an apparatus for conveying cotton seed and the like, the combination of a pair of bearings, a plurality of spaced bents disposed between the bearings, an open-sided tubular member having its exterior periphery rotatably supported by said bents, a spiraled conveyer rotatably supported by said tubular member and also supported by said bearings and means for rotating said member about said conveyer.

5. In an apparatus for conveying cotton seed and the like, the combination of a pair of spaced bearings, a plurality of spaced bents disposed between the bearings, an open-sided tubular member passing through at least one of said bents, means carried by said bents for rotatably supporting the periphery of said tubular member, a spiraled conveyer rotatably supported by said tubular member and by said spaced bearings and means for rotating said member about the conveyer.

FRED P. JOHNSON.